US012142932B2

(12) United States Patent
Yun et al.

(10) Patent No.: US 12,142,932 B2
(45) Date of Patent: Nov. 12, 2024

(54) WIRELESS POWER TRANSMISSION RESONATOR USING CONDUCTING WIRE WITH VERTICAL RECTANGULAR CROSS-SECTION

(71) Applicant: ELECTRONICS AND TELECOMMUNICATIONS RESEARCH INSTITUTE, Daejeon (KR)

(72) Inventors: Je Hoon Yun, Daejeon (KR); Sang-Won Kim, Daejeon (KR); Seong-Min Kim, Daejeon (KR); Jung Ick Moon, Daejeon (KR); In Kui Cho, Daejeon (KR); Gwangzeen Ko, Daejeon (KR); Dong Won Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 211 days.

(21) Appl. No.: 17/976,077

(22) Filed: Oct. 28, 2022

(65) Prior Publication Data

US 2023/0140065 A1 May 4, 2023

(51) Int. Cl.
*H02J 50/00* (2016.01)
*H01F 27/28* (2006.01)
*H02J 50/12* (2016.01)

(52) U.S. Cl.
CPC ........ *H02J 50/005* (2020.01); *H01F 27/2823* (2013.01); *H02J 50/12* (2016.02)

(58) Field of Classification Search
CPC ..... H02J 50/005; H02J 50/12; H01F 27/2823; H01F 27/2847; H01F 38/14
See application file for complete search history.

(56) References Cited

U.S. PATENT DOCUMENTS 8,400,248 B2 *  3/2013  Kim ................. H04B 5/26
                                          336/200
9,246,336 B2 *  1/2016  Kurs ................ H03H 7/40
                         (Continued)

FOREIGN PATENT DOCUMENTS

KR       10-1330290 B1    11/2013
KR    10-2015-0072621 A    6/2015
                         (Continued)

OTHER PUBLICATIONS

Maja Skiljo, et al., "Increasing the Radiation Efficiency and Resistance of Electrically Small Spherical Helical Antenna for Wireless Power Transfer", Software, Telecommunications and Computer Networks (SoftCOM), 2013 21st International Conference.
(Continued)

*Primary Examiner* — Jared Fureman
*Assistant Examiner* — Michael J Warmflash
(74) *Attorney, Agent, or Firm* — LRK PATENT LAW FIRM

(57) ABSTRACT

A wireless power transmission resonator using a conducting wire with a vertical rectangular cross-section is disclosed. The wireless power transmission resonator may include a first element including a first element upper part arranged in an upper end of a resonator and a first element lower part arranged in a lower end of the resonator, wherein the first element upper part and the first element lower part each may include a spiral layer having a spiral structure that is wound to face a wide surface of a conducting wire including a vertical rectangular cross-section and a second element arranged in a center of the resonator and between the first element upper part and the first element lower part and including a spiral layer having a spiral structure that is wound to face the wide surface of the conducting wire including the vertical rectangular cross-section.

15 Claims, 21 Drawing Sheets

(56) References Cited

U.S. PATENT DOCUMENTS

| | | | | |
|---|---|---|---|---|
| 10,476,159 | B2* | 11/2019 | Yun | H04B 5/79 |
| 11,049,644 | B2* | 6/2021 | Albrecht | H02K 41/031 |
| 11,610,727 | B2* | 3/2023 | Kawashima | H01F 41/061 |
| 2011/0049978 | A1* | 3/2011 | Sasaki | B60L 53/122 |
| | | | | 307/104 |
| 2013/0181541 | A1* | 7/2013 | Karalis | H02J 50/80 |
| | | | | 307/104 |
| 2013/0257173 | A1* | 10/2013 | Saitoh | H02J 50/70 |
| | | | | 307/104 |
| 2016/0344094 | A1* | 11/2016 | Singh | A61N 1/3787 |
| 2018/0323001 | A1* | 11/2018 | Albrecht | H01F 27/2847 |
| 2022/0028434 | A1* | 1/2022 | Choi | G11C 16/24 |

FOREIGN PATENT DOCUMENTS

| KR | 10-1584800 B1 | 1/2016 |
|---|---|---|
| KR | 10-2018-0050211 A | 5/2018 |
| KR | 10-2021-0127836 A | 10/2021 |
| KR | 10-2022-0028434 A | 3/2022 |

OTHER PUBLICATIONS

S. Rasti Boroujeni, et al., "Investigation of electric and magnetic Coupling between two helical resonators of a wireless power transfer system", Electronics Letters Feb. 18, 2016 vol. 52 No. 4 pp. 312-314.

Y. Kim, et al., "Investigation of coupled mode behaviour of electrically small meander antennas", Electronics Letters Nov. 8, 2007 vol. 43 No. 23.

Andre Kurs, et al., "Wireless Power Transfer via Strongly Coupled Magnetic Resonances", DOI: 10.1126/science.1143254, Science 317, 83 (2007).

Hui-Fen Huang, et al., "A Spiral Electrically Small Magnetic Antenna with High Radiation Efficiency for Wireless", Power Transfer, IEEE Antennas and Wireless Propagation Letters, vol. 15 2016.

* cited by examiner

WIRELESS POWER TRANSMISSION RESONATOR USING CONDUCTING WIRE WITH VERTICAL RECTANGULAR CROSS-SECTION

CROSS-REFERENCE TO RELATED APPLICATIONS

This application claims the benefit of Korean Patent Application No. 10-2021-0149787 filed on Nov. 3, 2021, and Korean Patent Application No. 10-2022-0112603 filed on Sep. 6, 2022, in the Korean Intellectual Property Office, the entire disclosures of which are incorporated herein by reference for all purposes.

BACKGROUND

1. Field of the Invention

One or more example embodiments relate to a wireless power transmission resonator using a conducting wire with a vertical rectangular cross-section.

2. Description of Related Art

Wireless power transmission using an electric and magnetic field mixed coupling method may transmit power farther than wireless power transmission using a magnetic field coupling method and wireless power transmission using an electric field coupling method. Wireless power transmission using the electric and magnetic field mixed coupling method may transmit power farther and may improve transmission efficiency by inducing coupling of positives of an electric field and a magnetic field. In the electric and magnetic field mixed coupling method, a sum of an electric field coefficient and a magnetic coupling coefficient may be determined to be a total coupling coefficient.

SUMMARY

Example embodiments provide a wireless power transmission resonator using a conducting wire with a vertical rectangular cross-section to remove an electric field and a magnetic field, which intervene with coupling, and solve spreading of an edge current and a line of magnetic force generated by the wireless power transmission resonator in an electric and magnetic field mixed coupling method.

According to an aspect, there is provided a wireless power transmission resonator including a first element including a first element upper part arranged in an upper end of a resonator and a first element lower part arranged in a lower end of the resonator, wherein the first element upper part may include a spiral layer having a spiral structure that is wound to face a wide surface of a conducting wire including a vertical rectangular cross-section and the first element lower part may include a spiral layer having a spiral structure that is wound to face the wide surface of the conducting wire including the vertical rectangular cross-section, a second element arranged in a center of the resonator and between the first element upper part and the first element lower part and including a spiral layer having a spiral structure that is wound to face the wide surface of the conducting wire including the vertical rectangular cross-section, and a power supply connected to the first element or the second element and configured to provide power to the resonator.

The first element upper part and the first element lower part may include a laminating structure including a spiral layer including one or more layers, and the first element upper part may be connected to the first element lower part by one conducting wire including a vertical rectangular cross-section.

The spiral structure of the first element upper part and the spiral structure of the first element lower part may include at least one of a circular spiral structure, a quadrangular spiral structure, a hexagonal spiral structure, and an octagonal spiral structure, or a combination of two or more thereof.

The second element may include a laminating structure including a spiral layer including one or more layers and may be connected to the first element upper part and the first element lower part by one conducting wire including a vertical rectangular cross-section.

The spiral structure of the second element may include at least one of a circular spiral structure, a quadrangular spiral structure, a hexagonal spiral structure, and an octagonal spiral structure, or a combination of two or more thereof.

The conducting wire including the vertical rectangular cross-section may include at least one of a diagonal cross mesh pattern and a cross mesh pattern or a combination of two or more thereof.

The power supply may include at least one of an indirect power supply and a direct power supply or a combination of two or more thereof.

According to an aspect, there is provided a wireless power transmission resonator including a resonator upper part arranged in an upper end of a resonator and including a spiral layer having a spiral structure that is wound to face a wide surface of a conducting wire including a vertical rectangular cross-section, a resonator lower part arranged in a lower end of a resonator and including a spiral layer having a spiral structure that is wound to face the wide surface of the conducting wire including the vertical rectangular cross-section, and a power supply connected to the resonator upper part and the resonator lower part and configured to provide power to the resonator.

The resonator upper part and the resonator lower part may include a laminating structure including a spiral layer including one or more layers, and the resonator upper part may be connected to the resonator lower part by one conducting wire including a vertical rectangular cross-section.

The spiral structure of the resonator upper part and the spiral structure of the resonator lower part may include at least one of a circular spiral structure, a quadrangular spiral structure, a hexagonal spiral structure, and an octagonal spiral structure, or a combination of two or more thereof.

The wireless power transmission resonator may further include an element arranged in a center of the wireless power transmission resonator and between the resonator upper part and the resonator lower part, wherein the element may include a spiral layer having a spiral structure that is wound to face a wide surface of a conducting wire including a vertical rectangular cross-section and a laminating structure including a spiral layer including one or more layers.

The spiral structure of the element may include at least one of a circular spiral structure, a quadrangular spiral structure, a hexagonal spiral structure, and an octagonal spiral structure, or a combination of two or more thereof.

The conducting wire including the vertical rectangular cross-section may include at least one of a diagonal cross mesh pattern and a cross mesh pattern or a combination of two or more thereof.

The power supply may include at least one of an indirect power supply and a direct power supply or a combination of two or more thereof.

According to an aspect, there is provided a wireless power transmission resonator including a resonator upper part arranged in an upper end of a resonator and including a laminating structure including one or more spiral layers having a spiral structure that is wound to face a wide surface of a conducting wire including a vertical rectangular cross-section, a resonator lower part arranged in a lower end of a resonator, connected to the resonator upper part by one conducting wire, and including a laminating structure including one or more spiral layers having a spiral structure that is wound to face the wide surface of the conducting wire including the vertical rectangular cross-section, an element arranged in a center of the resonator and between the first resonator upper part and the resonator lower part, connected to the resonator upper part and the resonator lower part by one conducting wire, and including a laminating structure including one or more spiral layers having a spiral structure that is wound to face the wide surface of the conducting wire including the vertical rectangular cross-section, and a power supply connected to the element and configured to provide power to the resonator.

Additional aspects of example embodiments will be set forth in part in the description which follows and, in part, will be apparent from the description, or may be learned by practice of the disclosure.

According to example embodiments, a wireless power transmission resonator using a conducting wire including a vertical rectangular cross-section may reduce an occurrence of an edge current, may concentrate a line of magnetic force, and may remove an electric field and a magnetic field, which intervene with coupling.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
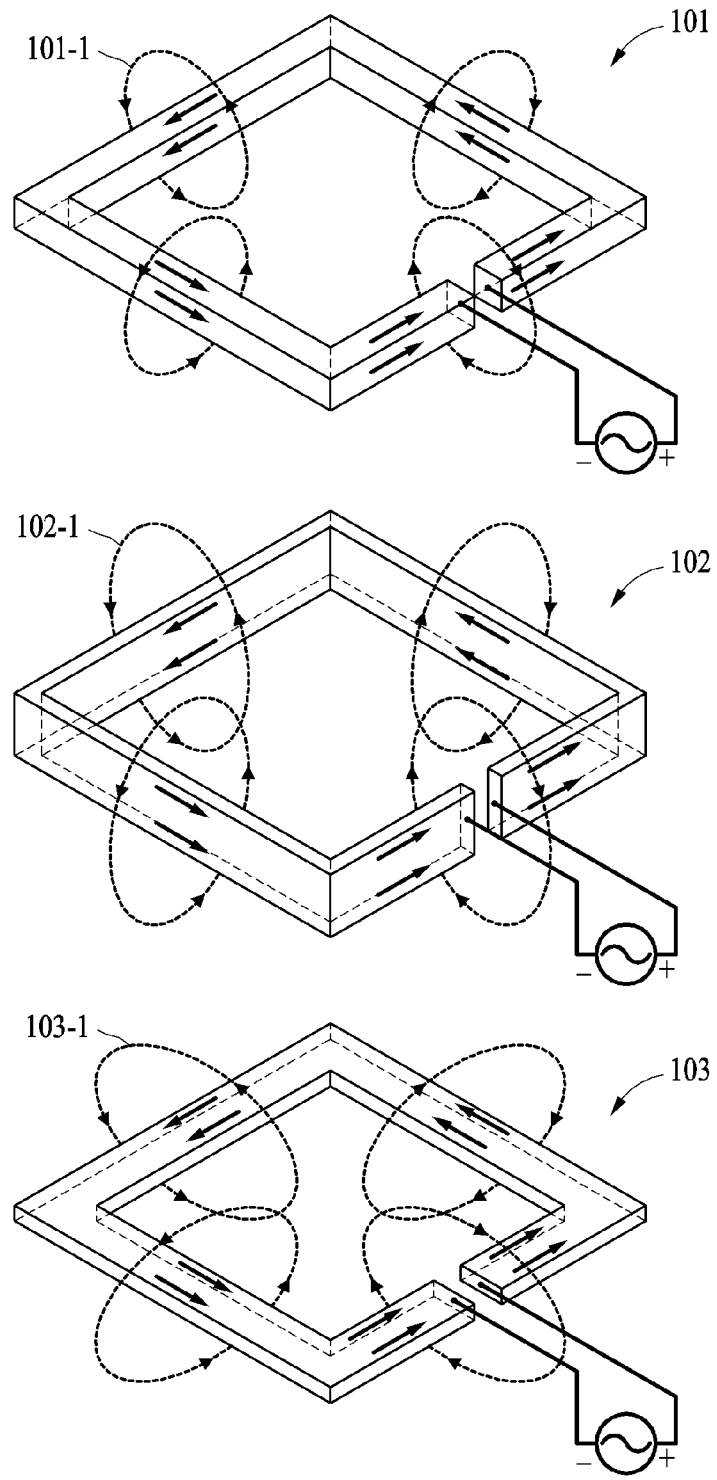
FIG. 1 is a diagram illustrating a characteristic of a magnetic field based on a cross-section of a conducting wire in a loop resonator according to an example embodiment.

Hereinafter, examples will be described in detail with reference to the accompanying drawings. The scope of the right, however, should not be construed as limited to the example embodiments set forth herein. In the drawings, like reference numerals are used for like elements.

Various modifications may be made to the examples. Here, the examples are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular examples only and is not to be limiting of the examples. As used herein, the singular forms "a", "an", and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating a characteristic of a magnetic field based on a cross-section of a conducting wire in a loop resonator according to an example embodiment.

FIG. 1 illustrates a loop resonator 101 including a conducting wire with a square cross-section, a loop resonator 102 including a conducting wire with a vertical rectangular cross-section, and a loop resonator 103 including a conducting wire with a horizontal rectangular cross-section.

Each of the resonators may have the same weight and only the shapes of the cross-sections may be different. Each of the resonators may be connected to a power supply. A current may flow from a cathode to an anode. Therefore, the current may flow in a counterclockwise direction. A magnetic field may occur when the current flows. Referring to FIG. 1, according to Ampere's circuital law, a magnetic field may be generated in the counterclockwise direction.

A magnetic field 101-1 of a loop resonator including a conducting wire with a square cross-section may be generated in the counterclockwise direction and may have a circular shape of which a radius is the same as the radius from the center of the conducting wire. A magnetic field 102-1 of a loop resonator including a conducting wire with a vertical rectangular cross-section may be generated in the counterclockwise direction and may have a vertically long elliptical shape. A magnetic field 103-1 of a loop resonator including a conducting wire with a horizontal rectangular cross-section may be generated in the counterclockwise direction and may have a horizontally long elliptical shape.

Hereinafter, the efficiency of each of the loop resonators may be determined.

Figure 2:
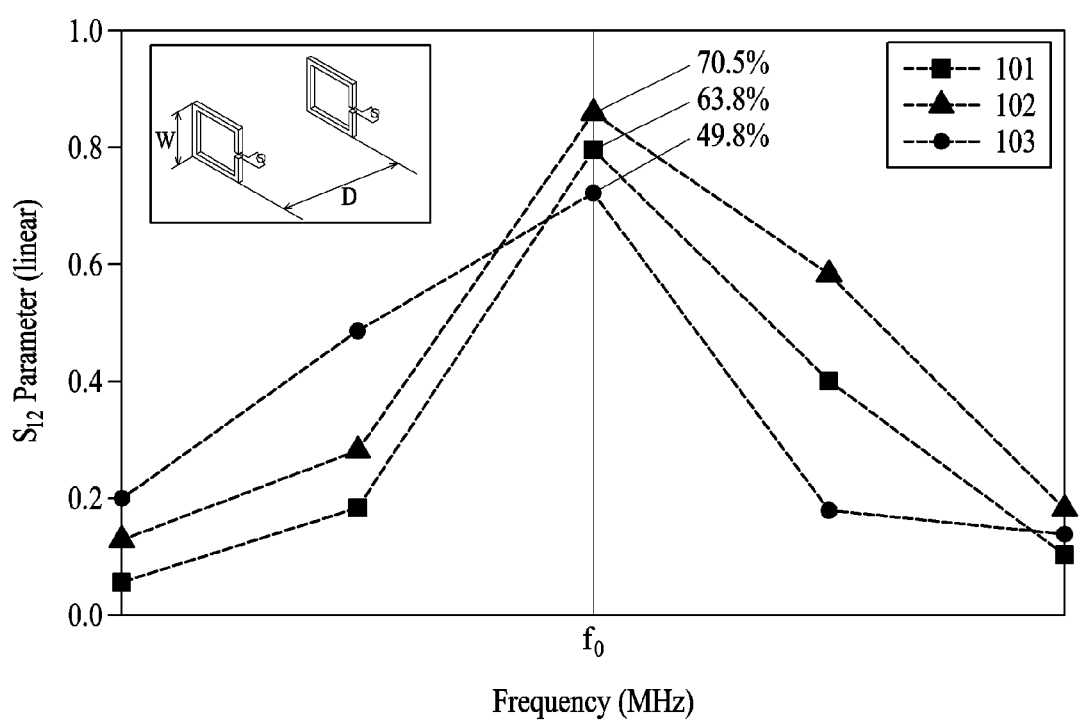
FIG. 2 is a diagram illustrating a characteristic of an $S_{12}$ parameter based on a cross-section of a conducting wire in a loop resonator according to an example embodiment.

FIG. 2 is a diagram illustrating a characteristic of an $S_{12}$ parameter based on a cross-section of a conducting wire in a loop resonator according to an example embodiment.

FIG. 2 illustrates $S_{12}$ parameters according to a frequency when the loop resonators of FIG. 1 have the same size. The $S_{12}$ parameter may be a ratio of power transmitted from a port 1, which is a transmitter, to power received by a port 2, which is a receiver. As $S_{12}$ increases, the efficiency of the resonator may increase.

Accordingly, the loop resonator 101 including a conducting wire with a square cross-section may have 63.8% efficiency at a resonant frequency $f_0$. The loop resonator 102 including a conducting wire with a vertical rectangular cross-section may have 70.5% efficiency at the resonant frequency $f_0$. The loop resonator 103 including a conducting wire with a horizontal rectangular cross-section may have 49.8% efficiency at the resonant frequency $f_0$. The efficiency of the loop resonator 102 including a conducting wire with a vertical rectangular cross-section may be the greatest.

A current may flow in a wide range due to a skin effect and may generate a magnetic field while flowing on the surface of a conductor. Here, a magnetic field generated by the loop resonator 102 including a conducting wire with a vertical rectangular cross-section may be more centrally concentrated than a magnetic field generated by a loop resonator including other conducting wires. Accordingly, the efficiency of the loop resonator 102 including a conducting wire with a vertical rectangular cross-section may be the greatest.

Hereinafter, a double spiral resonator including a conducting wire with a vertical rectangular cross-section that may decrease an edge current by minimizing the surface perpendicular to a magnetic flux direction is described.

Figure 3:
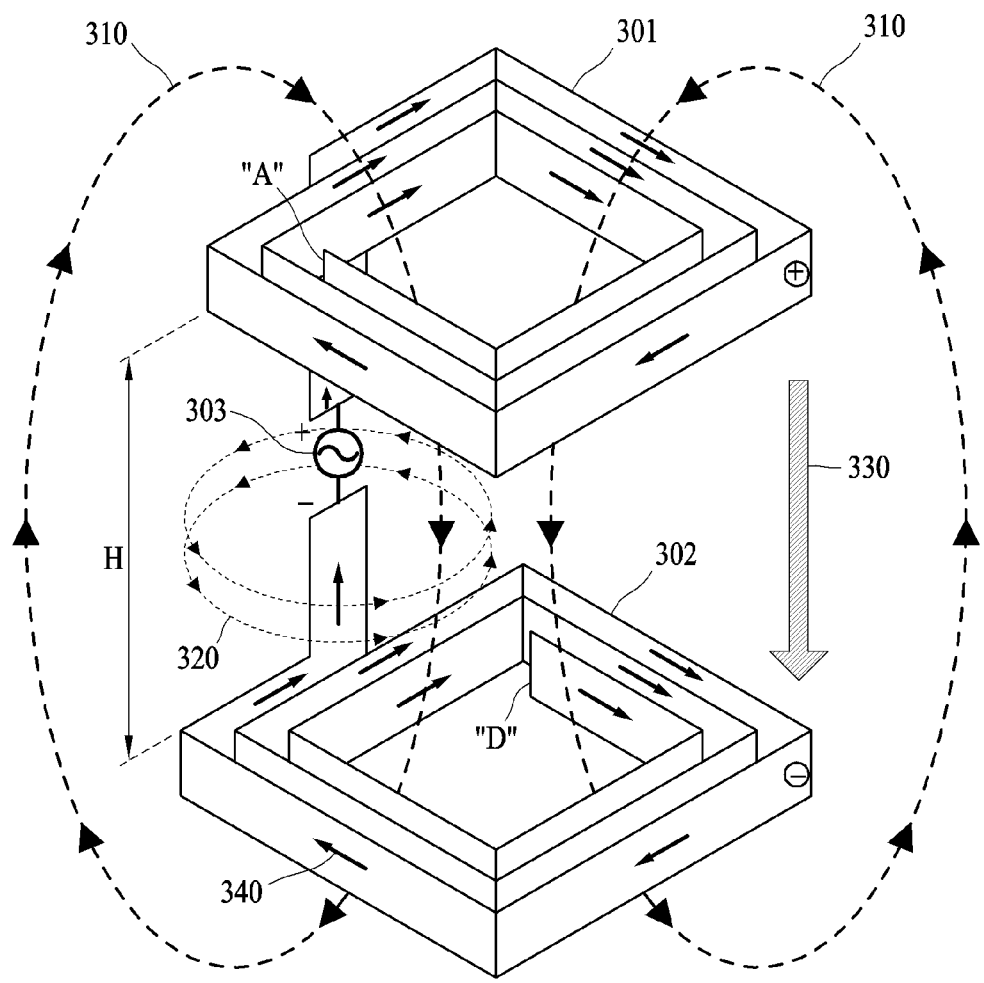
FIG. 3 is a diagram illustrating an electromagnetic distribution characteristic of a resonator according to an example embodiment.

FIG. 3 is a diagram illustrating an electromagnetic distribution characteristic of a resonator according to an example embodiment, FIG. 3 illustrates a resonator upper part 301, a resonator lower part 302, and a power supply 303.

The resonator upper part 301 and the resonator lower part 302 may include a spiral structure that is wound to face the wide surface of the conducting wire including the cross-section having a vertical rectangular shape. The resonator upper part 301 and the resonator lower part 302 may be spaced apart by a distance H. The cathode of the power supply 303 may be connected to the resonator upper part 301, and the anode of the power supply 303 may be connected to the resonator lower part 302. Accordingly, as the distance H between the resonator upper part 301 and the resonator lower part 302 increases, a potential difference may increase. As the potential difference increases, an electric coupling force may increase. That is, as the distance between the resonator upper part 301 and the resonator lower part 302 increases, the electric coupling force may increase, and thus, power may be transmitted farther.

In addition, the potential difference may be greater when the resonator upper part 301 and the resonator lower part 302 are horizontally arranged compared to a case where the resonator upper part 301 and the resonator lower part 302 are vertically arranged. When the resonator upper part 301 and the resonator lower part 302 are vertically arranged, an electric field 330 with a large coupling force may be generated. The electric field 330 with the large coupling force may increase as the potential difference increases. Accordingly, when the resonator upper part 301 and the resonator lower part 302 are vertically arranged, power may be transmitted farther.

Two types of magnetic fields may be generated by a current flowing in the resonator. A magnetic field 310 with a large coupling force and a vertically polarized wave characteristic may be generated by a current 340 flowing in the resonator upper part 301 and the resonator lower part 302. A magnetic field 320 with a low coupling force and a horizontally polarized wave characteristic may be generated by a current flowing in a conducting wire connected to the power supply 303.

A loss due to an edge current may be minimized by minimizing a surface perpendicular to the magnetic field 310 with the large coupling force. Since the magnetic field 320 with the low coupling force has the horizontally polarized wave characteristic and does not affect coupling, the magnetic field 320 with the low coupling force may be a component that is not helpful to wireless power transmission.

Hereinafter, a current distribution and a charge distribution of the resonator of FIG. 3 is described.

Figure 4:
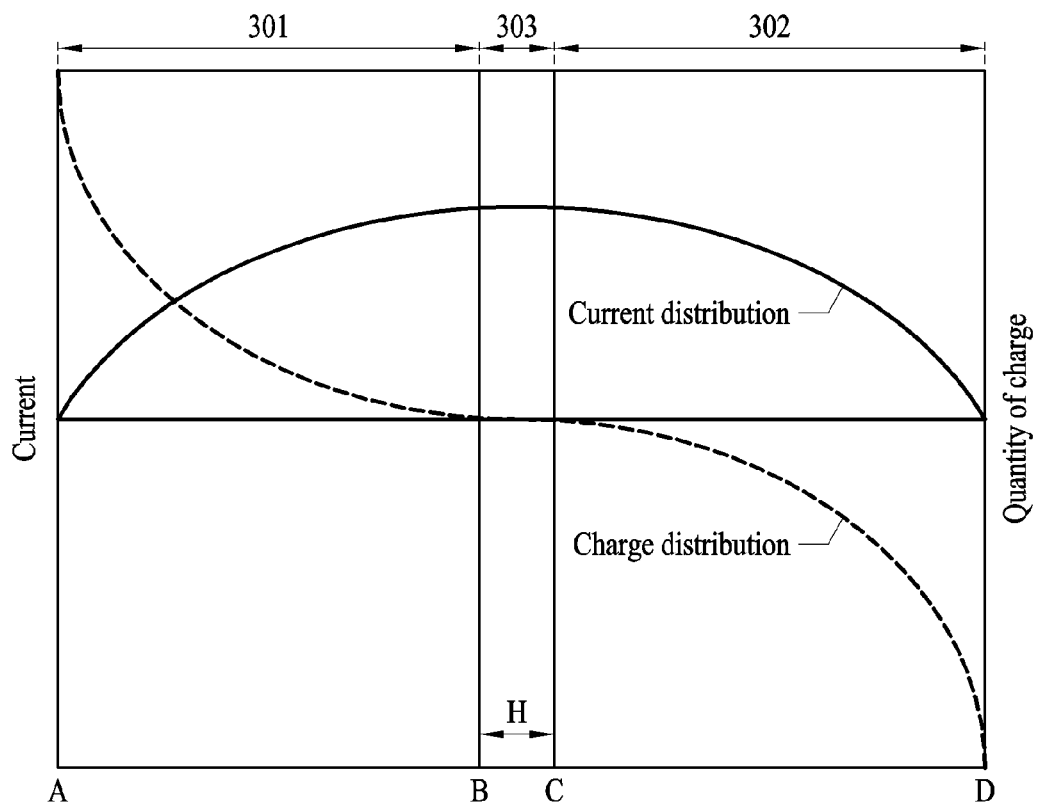
FIG. 4 is a diagram illustrating a current distribution and a charge distribution of the resonator of FIG. 3 according to an example embodiment.

FIG. 4 is a diagram illustrating a current distribution and a charge distribution of the resonator of FIG. 3 according to an example embodiment.

Referring to FIG. 4, the current distribution is the greatest around the power supply 303, which is the center of the resonator. That is, around the power supply 303, the intensity of the current may have the greatest distribution.

Since the resonator of FIG. 3 is a double spiral resonator using a conducting wire including a vertical rectangular cross-section and shows the greatest efficiency in FIG. 2, the resonator of FIG. 3 may have a greater transmission efficiency and may transmit power farther than a prior resonator. However, although the intensity of the current has the greatest distribution around the power supply 303, unavailability of using this to increase coupling may be a loss.

Accordingly, hereinafter, a method of using a current around the power supply 303 to increase coupling is described.

Figure 5:
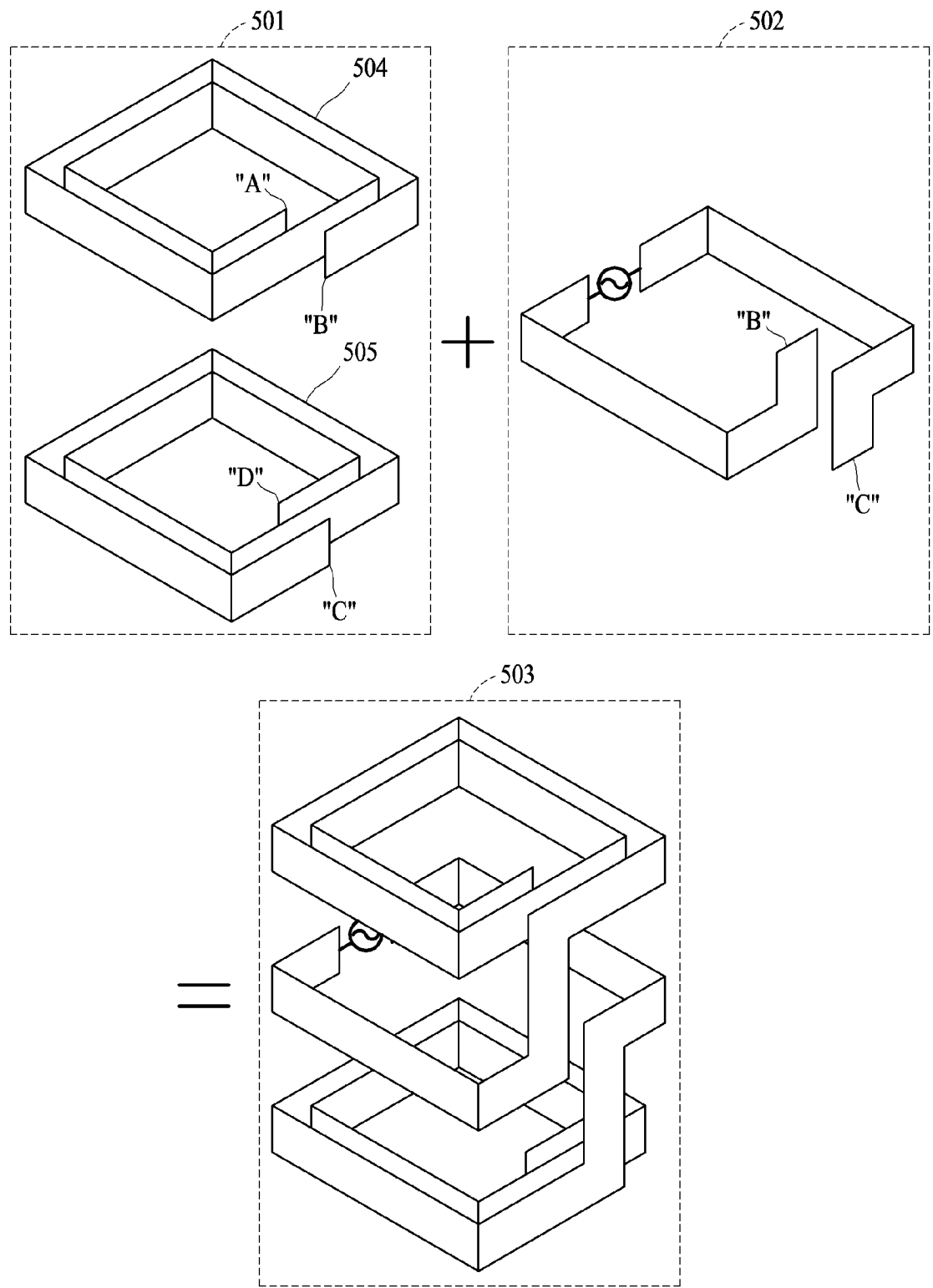
FIG. 5 is a diagram illustrating a resonator for increasing a magnetic field coupling according to an example embodiment.

FIG. 5 is a diagram illustrating a resonator for increasing a magnetic field coupling according to an example embodiment.

FIG. 5 illustrates a first element 501 and a second element 502, wherein the first element 501 including a first element upper part 504 and a first element lower part 505. A resonator 503 may include the first element 501 and the second element 502. The second element 502 may be connected to a power supply.

The first element upper part 504 and the first element lower part 505 included in the first element 501 may include a spiral structure that is wound twice to face the wide surface of a conducting wire including a vertical rectangular cross-section. Each of the first element upper part 504 and the first element lower part 505 may include a single-layered spiral structure. That is, the first element upper part 504 and the first element lower part 505 may be single-layered and double-wound. The second element 502 may have a structure in which the central portion of the resonator where the power supply is located strongly generates magnetic field coupling.

The first element 501 may be an element in which electric coupling is strongly generated. The second element may be an element in which magnetic field coupling is strongly generated.

Since the first element 501 includes the spiral structure, the first element 501 may simultaneously generate electric coupling as well as magnetic field coupling due to current induction.

Hereinafter, a current distribution and a charge distribution of the resonator 503 of FIG. 5 is described.

Figure 6:
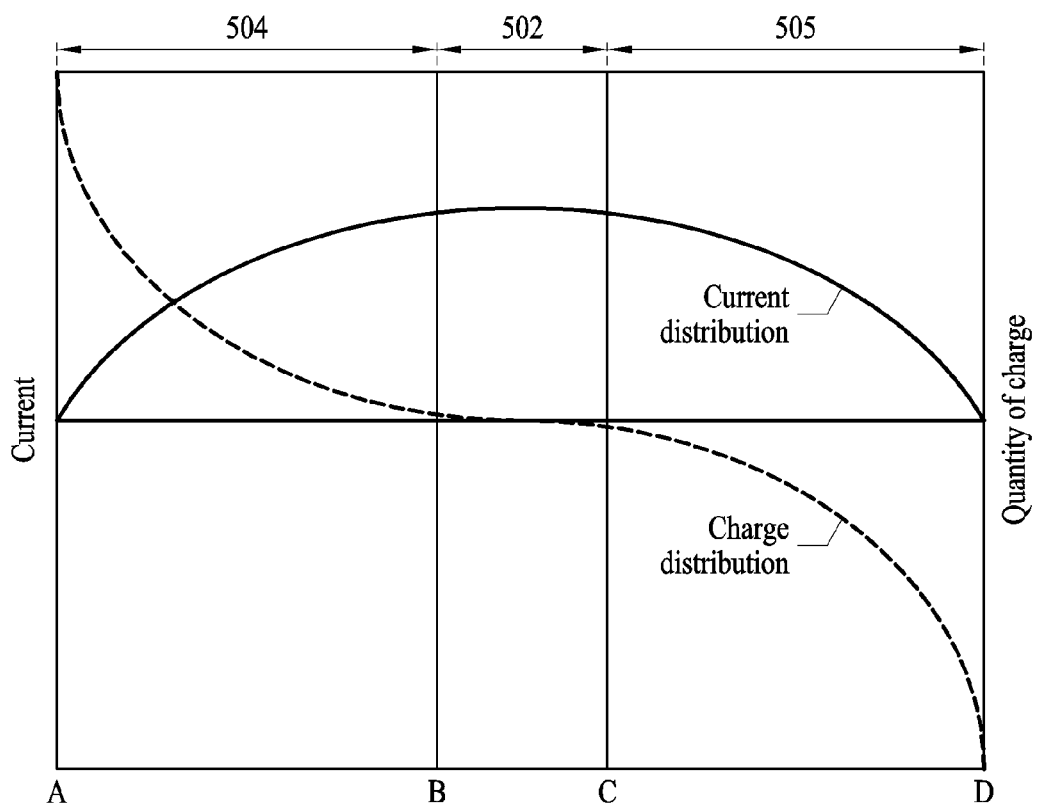
FIG. 6 is a diagram illustrating a current distribution and a charge distribution of the resonator of FIG. 5 according to an example embodiment.

FIG. 6 is a diagram illustrating a current distribution and a charge distribution of the resonator of FIG. 5 according to an example embodiment.

Referring to FIG. 6, in the resonator 503 of FIG. 5, the length of the second element 502, in which magnetic field coupling is strongly generated, is wider than the resonator of FIG. 3. Thus, the resonator 503 of FIG. 5 may transmit power farther than the resonator of FIG. 3.

By improving a structure of a resonator to increase magnetic field coupling using the high current distribution in the center of the resonator and increase electric coupling using the high charge distribution at both ends of the resonator, power may be transmitted farther.

Hereinafter, an electromagnetic distribution characteristic of the resonator 503 of FIG. 5 is described.

Figure 7:
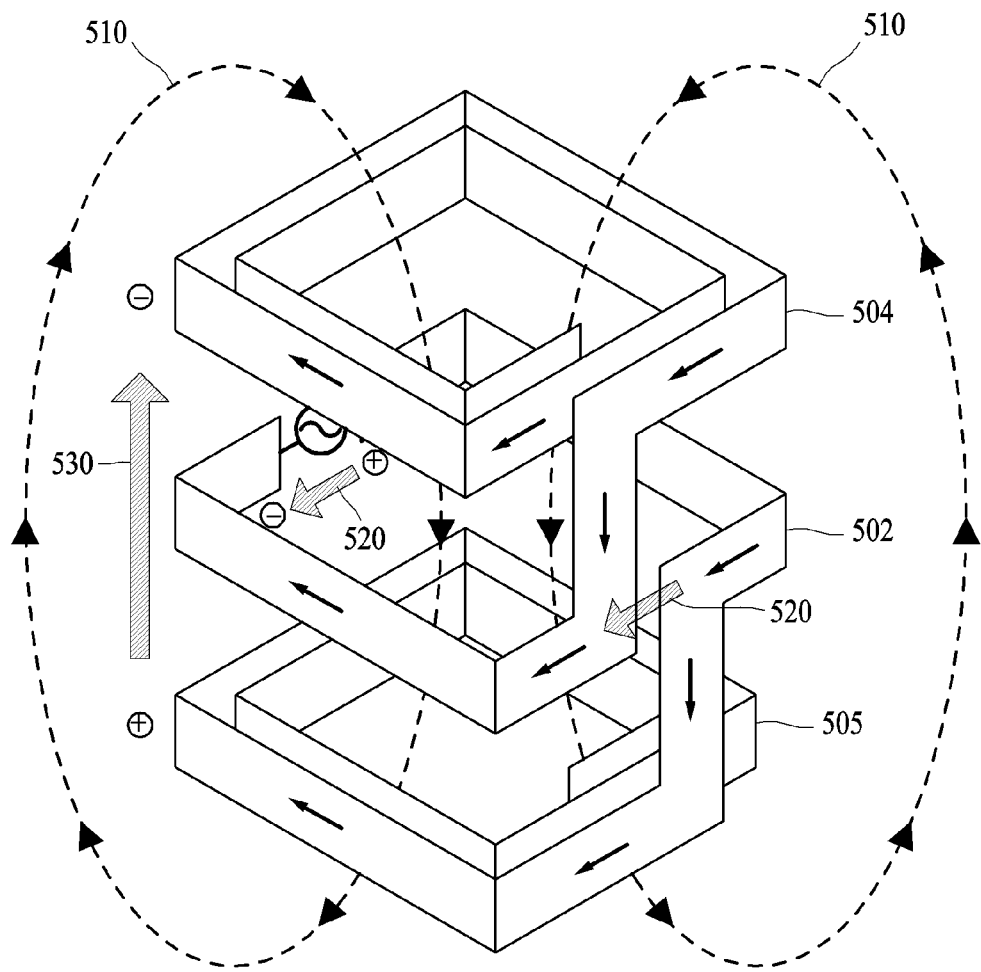
FIG. 7 is a diagram illustrating an electromagnetic distribution characteristic of the resonator of FIG. 5 according to an example embodiment.

FIG. 7 is a diagram illustrating an electromagnetic distribution characteristic of the resonator of FIG. 5 according to an example embodiment.

FIG. 7 illustrates the first element 501 and the second element 502, wherein the first element 501 includes the first element upper part 504 and the first element lower part 505. The resonator may include the first element 501 and the second element 502.

A magnetic field 510 with a large coupling force and a vertical polarized wave characteristic may be generated by a current flowing in the second element 502 as well as a current flowing in the first element upper part 504 and the first element lower part 505.

The second element 502 in which magnetic field coupling is strongly generated may be configured in a single layer and may be connected to the power supply. An electric field may be generated from the cathode to the anode. Accordingly, the electric field 520 with a low coupling force generated by the power supply may be generated from the cathode to the anode. The element field 520 with a low coupling force may be generated in a direction perpendicular to a direction of the electric field 530 with a large coupling force generated by the first element upper part 504 and the first element lower part 505.

When performing medium-range power transmission by vertically arranging transmission/reception resonators, power may be transmitted farther than the resonator of FIG. 3 as a current flowing in the second element 502, which is the center of the resonator 503 of FIG. 5, contributes to the magnetic field 510 with the large coupling force, however, the magnetic field 520 with the low coupling force that may not help power transmission may still exist.

When manufacturing a resonator by a conducting wire including a vertical rectangular cross-section, the current may flow on a wide surface, and thus, a resistive element may decrease. In addition, when arranging the resonator in a spiral structure to face the wide surface, an occurrence of an edge current may decrease as the magnetic field concentrates on the center and a vertical polarized wave element occurs in a direction perpendicular to an opening of the resonator.

Figure 8:
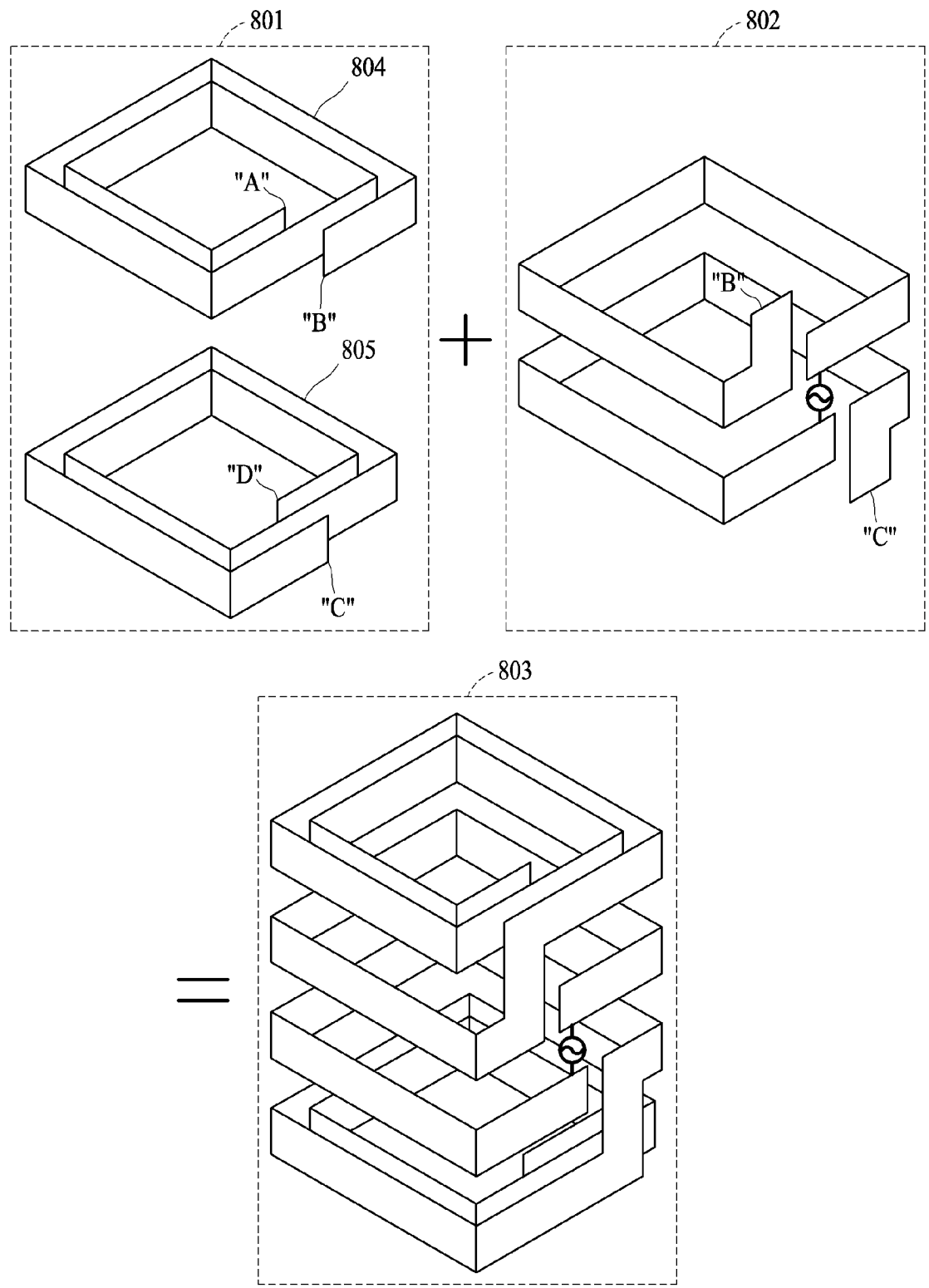
FIG. 8 is a diagram illustrating a resonator according to an example embodiment.

FIG. 8 is a diagram illustrating a resonator according to an example embodiment.

FIG. 8 illustrates a resonator 803 including a first element 801 and a second element 802, wherein the first element 801 includes a first element upper part 804 and a first element lower part 805.

Each of the first element upper part 804 and the first element lower part 805 may include a double-wound spiral structure. Each of the first element upper part 804 and the first element lower part 805 may include a single-layered spiral structure. That is, the first element upper part 804 and the first element lower part 805 may be single-layered and double-wound.

The second element 802 may include a single-wound spiral structure. The second element 802 may include a double-layered spiral structure. That is, the second element 802 may be double-layered and single-wound. The second element 802 may be connected to a power supply.

The resonator 803 may include the first element 801 and the second element 802. The second element 802 may be arranged in the center of the resonator. Both ends of the second element 802 may be connected to the first element upper part 804 and the first element lower part 805, respectively. The first element upper part 804 of the first element 801 may be arranged in the upper part of the resonator 803, and the first element lower part 805 may be arranged in the lower part of the resonator 803.

The resonator 803 may be in a structure configured to remove a magnetic field and an electric field that may not help the coupling force, concentrate the magnetic flux on the center, and minimize an edge current.

Hereinafter, a current distribution and a charge distribution of the resonator 803 is described.

Figure 9:
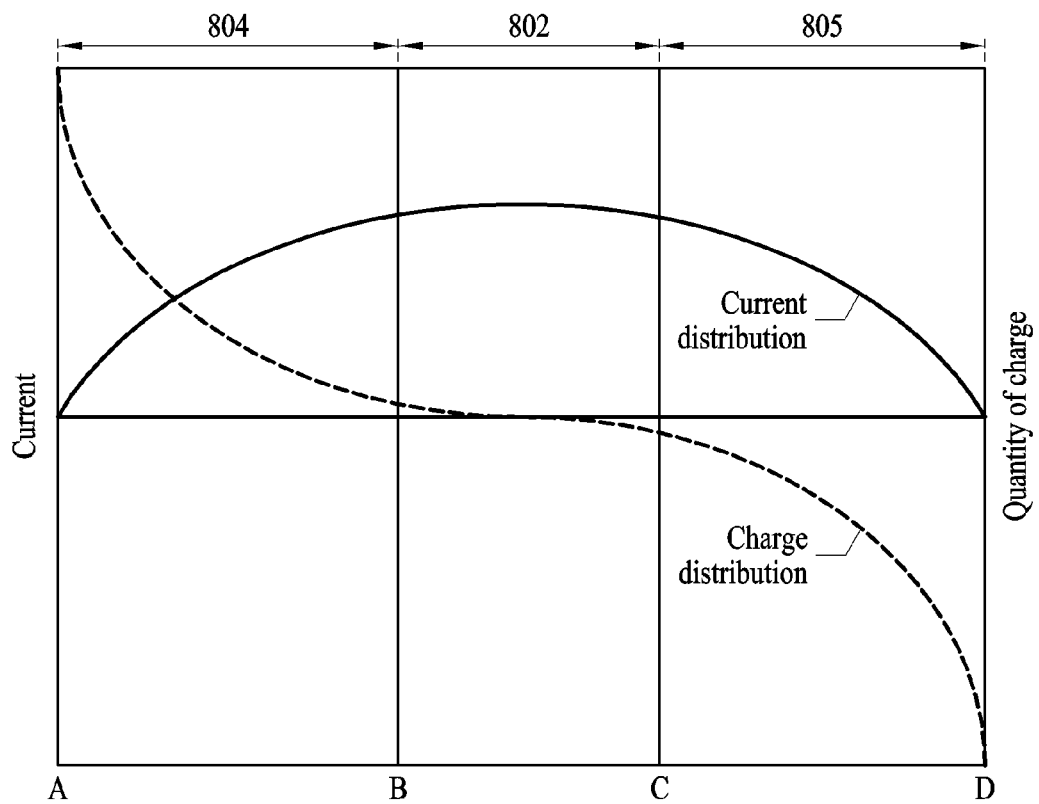
FIG. 9 is a diagram illustrating a current distribution and a charge distribution of the resonator of FIG. 8 according to an example embodiment.

FIG. 9 is a diagram illustrating a current distribution and a charge distribution of the resonator of FIG. 8 according to an example embodiment.

The resonator 803 of FIG. 8 may be a resonator configured to couple a magnetic field generated by the second element 802 that is arranged in the center of the resonator 803 and has a high current element as much as possible.

Referring to FIG. 9, in the resonator 803 of FIG. 8, the length of the second element 802, in which magnetic field coupling is strongly generated, is wider than the resonator 503 of FIG. 5. Thus, the resonator 803 of FIG. 8 may transmit power farther than the resonator 503 of FIG. 5.

Hereinafter, an electromagnetic distribution characteristic of the resonator 803 of FIG. 8 is described.

Figure 10:
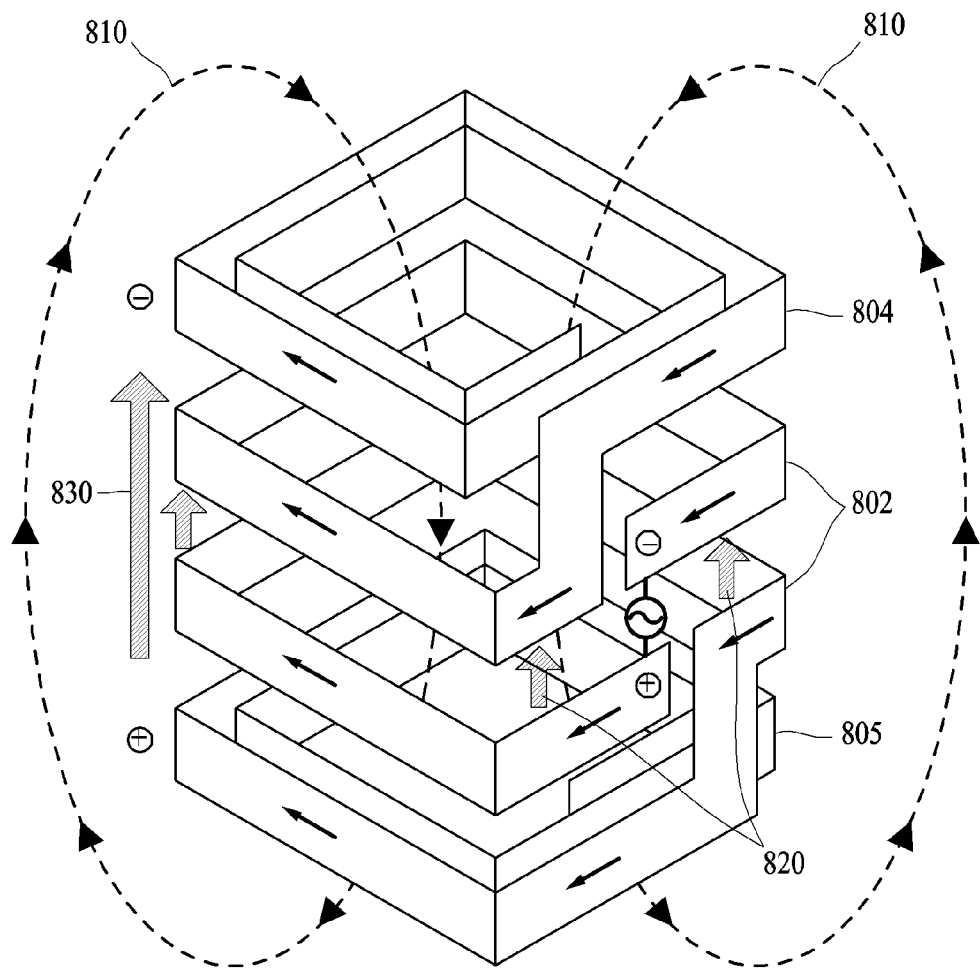
FIG. 10 is a diagram illustrating an electromagnetic distribution characteristic of the resonator of FIG. 8 according to an example embodiment.

FIG. 10 is a diagram illustrating an electromagnetic distribution characteristic of the resonator of FIG. 8 according to an example embodiment.

A magnetic field 810 with a large coupling force and a vertical polarized wave characteristic may be generated by a current flowing in the second element 802 as well as a current flowing in the first element upper part 804 and the first element lower part 805.

Referring to FIG. 10, the electric field 520 of FIG. 7 with the small coupling force decreases. Referring to FIG. 10, a power supply may be arranged in the center of the second element 802 and based on the power supply, a lower layer may be a cathode and an upper layer may be an anode. Accordingly, the electric field 520 with the small coupling force of FIG. 7 may decrease and the decreased electric field may be generated in a same direction as the electric field 830 with the large coupling force. Thus, electric coupling may increase.

Here, when performing medium-range power transmission by vertically arranging transmission/reception resonators, power may be transmitted farther than the resonator 503 of FIG. 5. Hereinafter, wireless power transmission using the resonator 803 of FIG. 8 is described.

Figure 11:
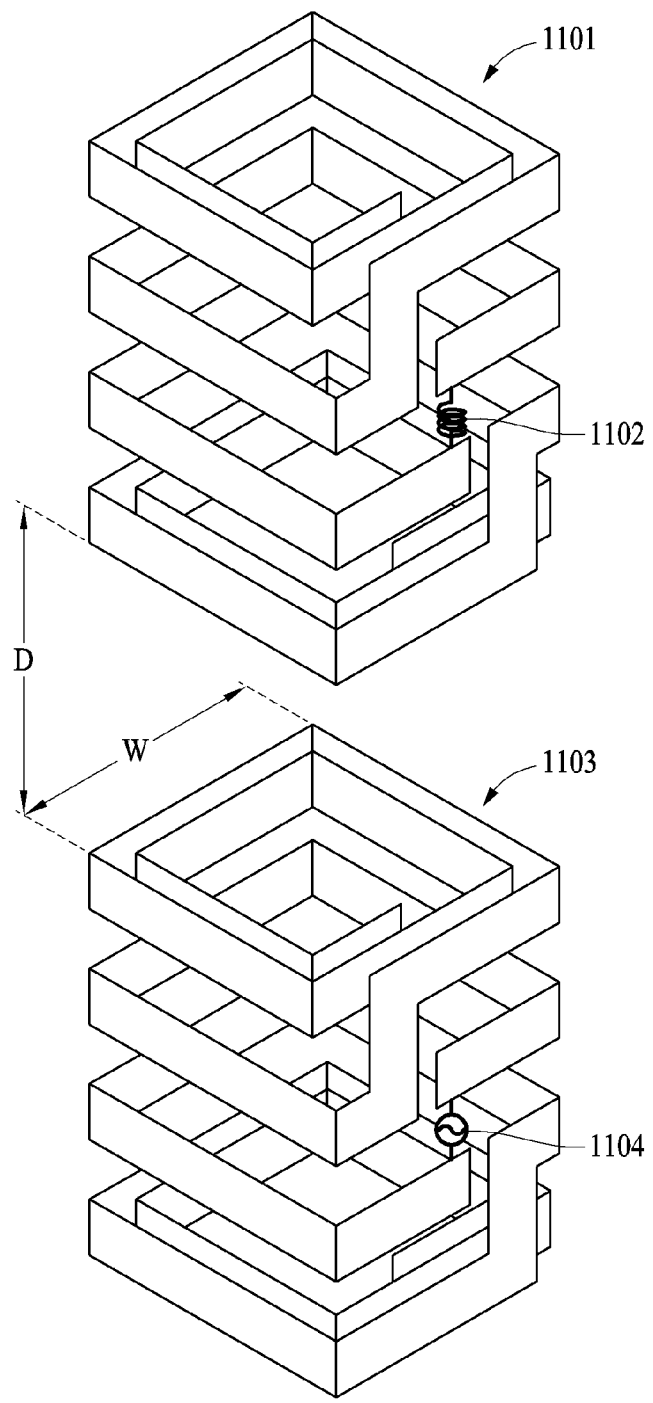
FIG. 11 is an example of implementing wireless power transmission using the resonator of FIG. 8 according to an example embodiment.

FIG. 11 is an example of implementing wireless power transmission using the resonator of FIG. 8 according to an example embodiment.

FIG. 11 illustrates a transmitter 1103 and a receiver 1101 using the resonator of FIG. 8. In the transmitter 1103, a power supply 1104 may be connected to a second element. In the receiver 1101, a load 1102 may be connected to the second element. The power supply 1104 may include any circuit and system configured to generate a power signal. The load 1104 may include a rectifying circuit configured to rectify an input radio frequency (RF) signal and a charging system.

The length of the largest side between the length side and the width side of openings of the transmitter 1103 and the receiver 1101 may be defined as W, and a distance between the transmitter 1103 and the receiver 1101 may be defined as D.

Hereinafter, an S parameter and a loss when the distance D between the receiver 1101 and the transmitter 1103 both including a copper wire is 10 W is described.

Figure 12:
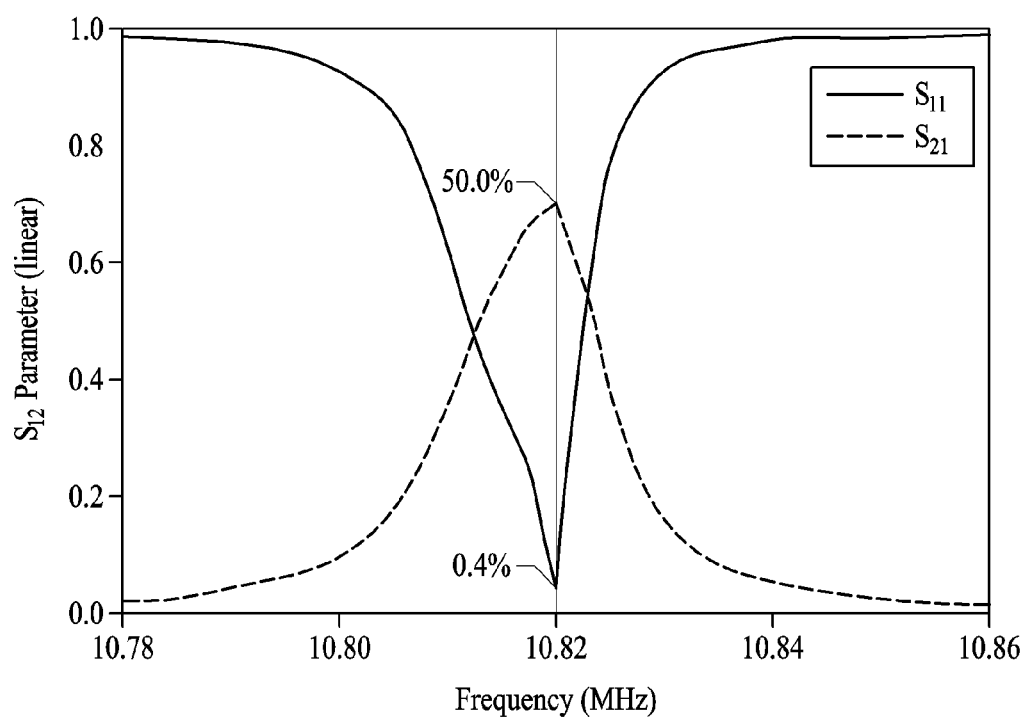
FIG. 12 is a diagram illustrating an S parameter characteristic of the resonator of FIG. 11 according to an example embodiment.

FIG. 12 is a diagram illustrating an S parameter characteristic of the resonator of FIG. 11 according to an example embodiment.

FIG. 12 illustrates $S_{12}$ and $S_{11}$ parameters when the distance D between the transmitter 1103 and the receiver 1101 is 10 W. The $S_{11}$ parameter may be a reflection coefficient of a transmitter. The $S_{12}$ parameter may be a ratio of power transmitted from a transmitter to power received by a receiver. As $S_{12}$ increases, the efficiency of the resonator may increase.

At the resonant frequency of 10.82 MHz, the power transmission efficiency of the resonator may be 50% and the reflection coefficient may be 0.4%. That is, when the distance D is less than 10 W, the power transmission efficiency of the resonator may be greater than or equal to 50%. The reflection coefficient 0.4% may indicate that impedance matching is properly achieved.

In case of a resonator using traditional copper, it is known that implementing a resonator having 50% efficiency when the distance D is greater than or equal to 5 W is a difficult technique. The resonator of the present disclosure may have 50% efficiency when D is 10 W and thus may transmit power farther than the resonator using traditional copper.

Figure 13:
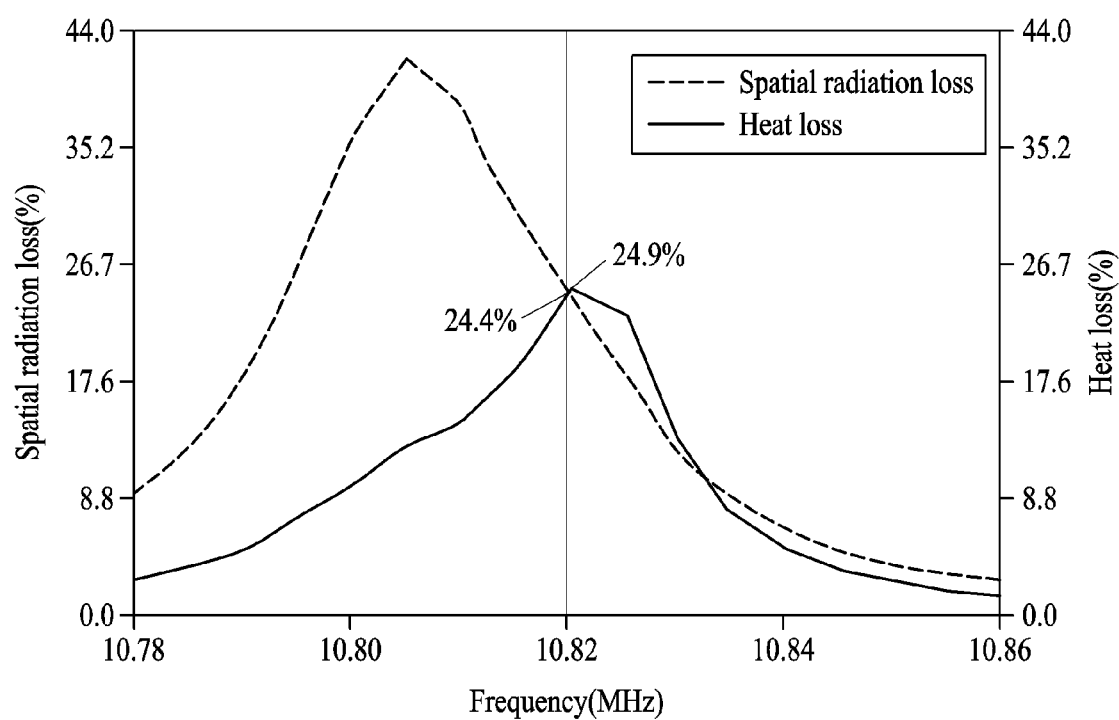
FIG. 13 is a diagram illustrating characteristics of spatial radiation loss and heat loss of the resonator of FIG. 11 according to an example embodiment.

FIG. 13 is a diagram illustrating characteristics of spatial radiation loss and heat loss of the resonator of FIG. 11 according to an example embodiment, FIG. 13 illustrates spatial radiation loss and heat loss characteristics when the distance D between the transmitter 1103 and the receiver 1101 is 10 W.

The spatial radiation loss may be maximized between 10.80 MHz and 10.82 MHz and may decrease as a frequency increases. The spatial radiation loss may be 24.4% at 10.82 MHz. The heat loss may be 24.9% at 10.82 MHz.

The frequency being used may change by adjusting the size of a resonator. Therefore, FIG. 13 illustrates spatial radiation loss and heat loss characteristics based on a 10.82 MHz frequency. However, the frequency may be tuned to an industry-science-medical (ISM) band as 6.78 MHz or 13.56 MHz. Hence, the resonator in the present disclosure may be used in a field where spatial radiation is allowed, like the ISM band, or may be applied to various fields by allocating a separate frequency.

Figure 14:
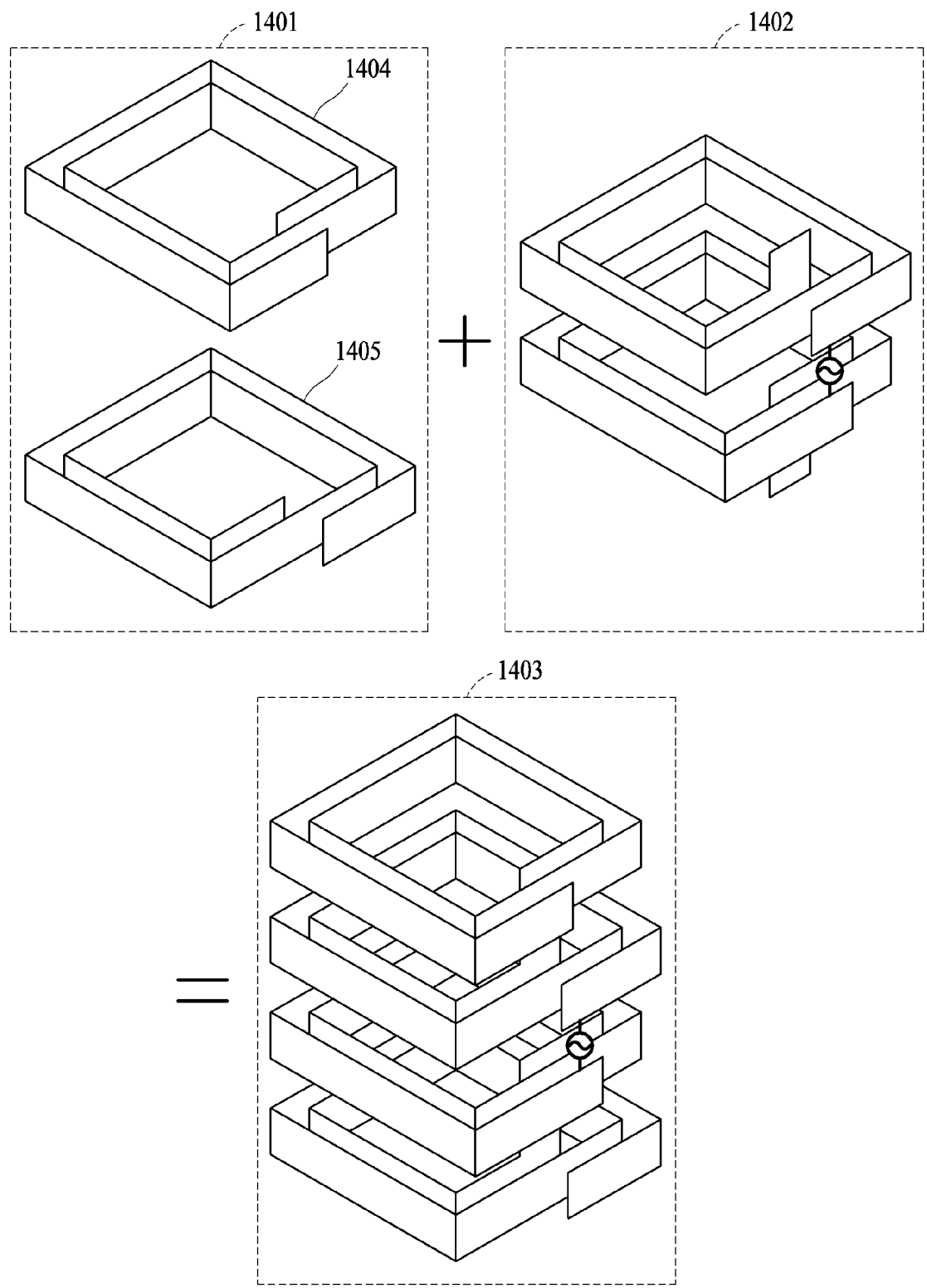
FIG. 14 is a diagram illustrating a resonator according to an example embodiment.

FIG. 14 is a diagram illustrating a resonator according to an example embodiment.

FIG. 14 illustrates a first element 1401 and a second element 1402, wherein the first element 1401 includes a first element upper part 1404 and a first element lower part 1405. A resonator 1403 may include the first element 1401 and the second element 1402. The second element 1402 may be connected to a power supply.

The first element upper part 1404 and the first element lower part 1405 may include a spiral structure that is wound twice to face the wide surface of a conducting wire including a vertical rectangular cross-section. Each of the first element upper part 1404 and the first element lower part 1405 may include a single-layered spiral structure. That is, the first element upper part 1404 and the first element lower part 1405 may be single-layered and double-wound.

The second element 1402 may include a double-wound spiral structure. The second element 1402 may include a double-layered spiral structure. That is, the second element 1402 may be double-layered and double-wound. The second element 1402 may be connected to a power supply.

The resonator 1403 may include the first element 1401 and the second element 1402. The second element 1402 may be arranged in the center of the resonator 1403. Both ends of the second element 1402 may be connected to the first element upper part 1404 and the first element lower part 1405, respectively.

Compared to the resonator 803 of FIG. 8, the resonator 1403 may include a wider area in which magnetic field coupling is strongly generated. Thus, the resonator 1403 may transmit power farther than the resonator 803 of FIG. 8.

Hereinafter, an S parameter, spatial radiation loss, and a heat loss of the resonator 1403 are described.

Figure 15:
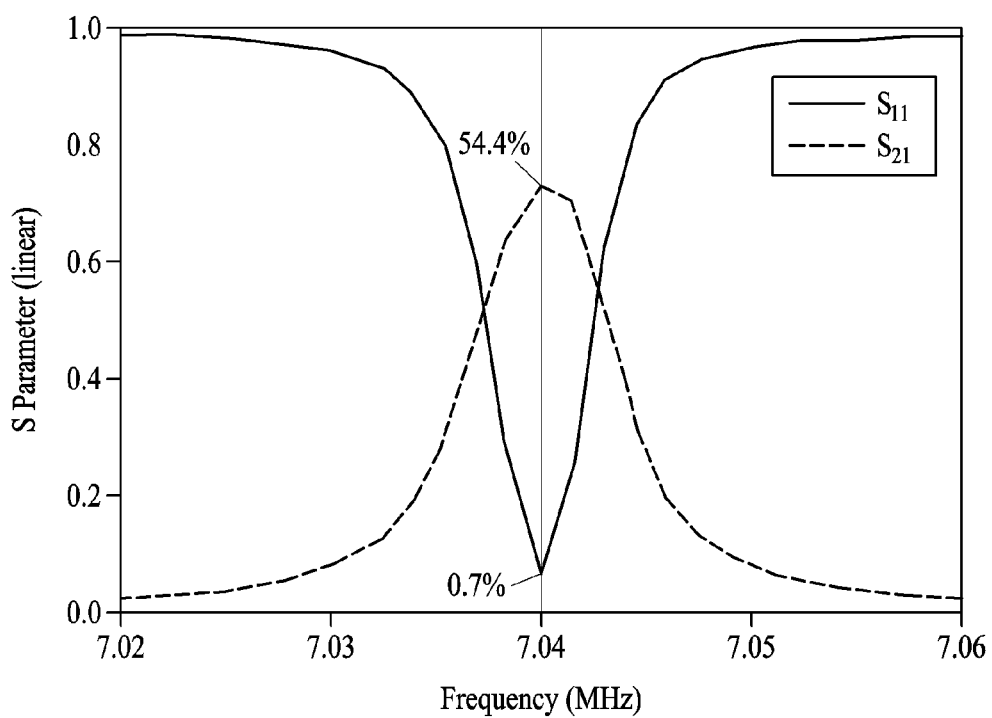
FIG. 15 is a diagram illustrating an S parameter characteristic of the resonator of FIG. 14 according to an example embodiment.

FIG. 15 is a diagram illustrating an S parameter characteristic of the resonator of FIG. 14 according to an example embodiment.

FIG. 15 illustrates $S_{12}$ and $S_{11}$ parameters when the distance D between the transmitter and the receiver using the resonator of FIG. 14 is 10 W. The $S_{11}$ parameter may be a reflection coefficient of a transmitter. The $S_{12}$ parameter may be a ratio of power transmitted from a transmitter to power received by a receiver. As $S_{12}$ increases, the efficiency of the resonator may increase.

At 7.04 MHz, the power transmission efficiency of the resonator may be 54.4%, and the reflection coefficient may be 0.7%. Since the power transmission efficiency of the resonator 1403 of FIG. 14 is 54.4% and the power transmission efficiency of the resonator 803 of FIG. 8 is 50%, the efficiency of the resonator 1403 of FIG. 14 may be better.

In the resonator 1403, the second element 1402 may be double-layered and double-wound and in the resonator 803, the second element 802 may be single-layered and double-wound. Thus, as the number of windings of a resonator's conducting wire with a vertical rectangular cross-section increases, the power transmission efficiency may increase.

Compared to the resonator 803, in the resonator 1403, a resonant frequency may decrease as the total length of the conducting wire increases.

Figure 16:
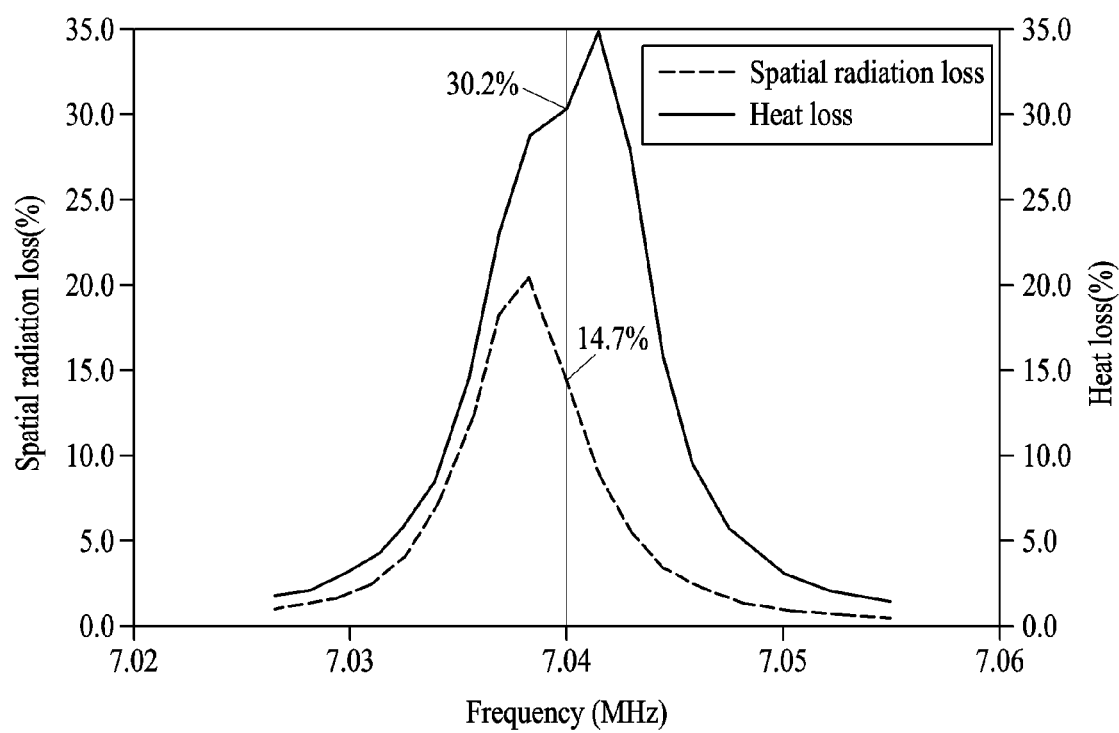
FIG. 16 is a diagram illustrating characteristics of spatial radiation loss and heat loss of the resonator of FIG. 14 according to an example embodiment.

FIG. 16 is a diagram illustrating characteristics of spatial radiation loss and heat loss of the resonator of FIG. 14 according to an example embodiment.

FIG. 16 illustrates spatial radiation loss and heat loss characteristics when the distance D of the resonator 1403 of FIG. 14 is 10 W.

At the resonant frequency of 7.04 MHz, a heat loss may be 30.2%. At the resonant frequency of 7.04 MHz, a spatial radiation loss may be 14.7%.

The heat loss and the spatial radiation loss may be adjusted by changing a design dimension and a material of a resonator. By using a metal having a high conductivity, such as silver, as a conducting wire, the heat loss may decrease and the power transmission efficiency may increase.

Hereinafter, a generalized structure of a resonator based on the above descriptions is described.

Figure 17:
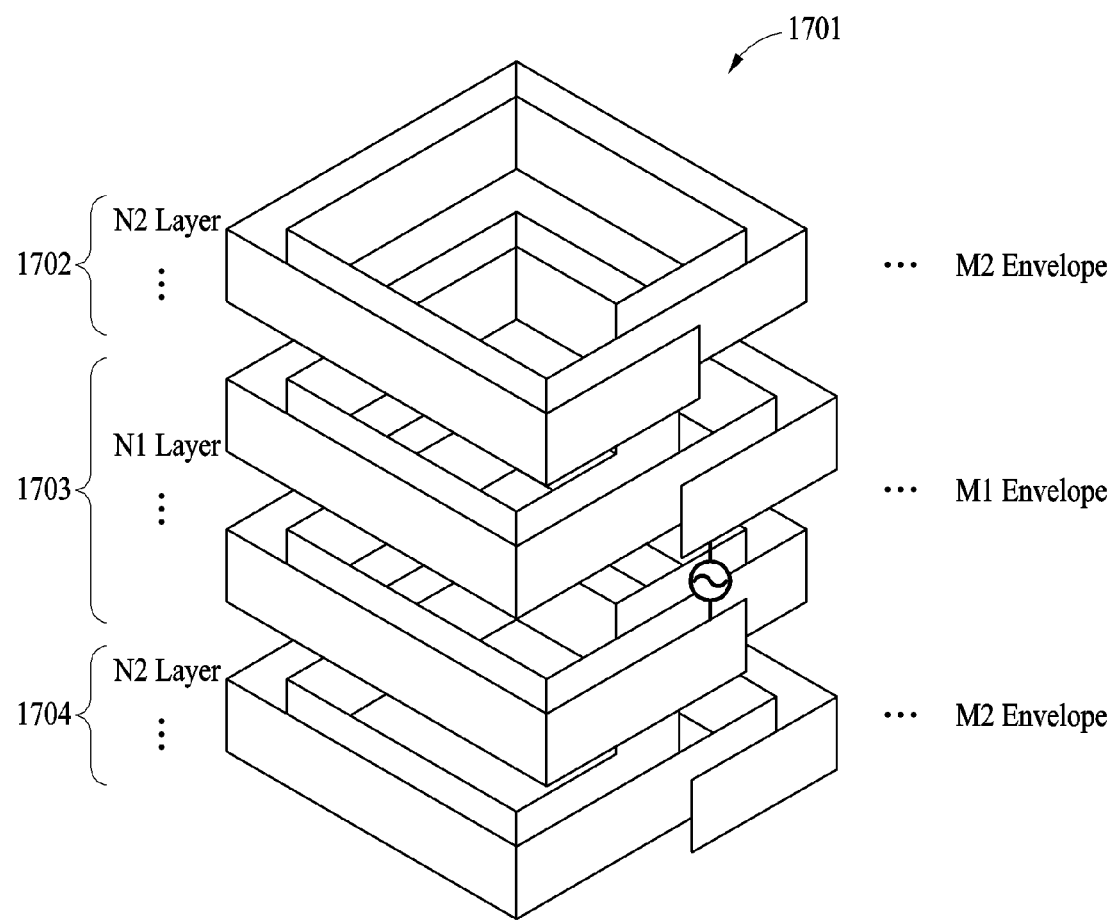
FIG. 17 is a diagram illustrating a resonator according to an example embodiment.

FIG. 17 is a diagram illustrating a resonator according to an example embodiment.

FIG. 17 illustrates a first element including the first element upper part 1702 and the first element lower part 1704 and the second element 1703.

The first element upper part 1702 may be arranged in the upper end of a resonator 1701. The first element upper part 1702 may include a spiral layer having a spiral structure that is wound to face the wide surface of a conducting wire including a cross-section having a vertical rectangular shape. The first element upper part 1702 may have a laminating structure including a spiral layer including one or more layers. The first element upper part 1702 may include a spiral layer including N2 layers, which is a plurality of layers. As the number of layers of the first element upper part 1702 increases, the efficiency of wireless power transmission may increase. The first element upper part 1702 may include a spiral structure including M2 envelopes. As the number of envelopes of the first element upper part 1702 increases, the efficiency of wireless power transmission may increase.

The first element lower part 1704 may be arranged in the lower end of the resonator 1701. The first element lower part 1704 may include a spiral layer having a spiral structure that is wound to face the wide surface of a conducting wire including a cross-section having a vertical rectangular shape. The first element lower part 1704 may have a laminating structure including a spiral layer including one or more layers. The first element lower part 1704 may include a spiral layer including N2 layers, which is a plurality of layers. As the number of layers of the first element lower part 1704 increases, the efficiency of wireless power transmission may increase. The first element lower part 1704 may include a spiral structure including M2 envelopes. As the number of envelopes of the first element lower part 1704 increases, the efficiency of wireless power transmission may increase. The first element lower part 1704 may be connected to the first element upper part 1701 by one conducting wire including a vertical rectangular cross-section.

The second element 1703 may be between the first element upper part 1702 and the first element lower part 1704. The second element 1703 may be arranged in the center of the resonator 1701. The second element 1703 may include a spiral layer having a spiral structure that is wound to face the wide surface of a conducting wire including a cross-section having a vertical rectangular shape. The second element 1703 may include a spiral layer including N1 layers, which is a plurality of layers. As the number of layers of the second element 1703 increases, the efficiency of wireless power transmission may increase. The second element 1703 may include a spiral structure including M1 envelopes. As the number of envelopes of second element 1703 increases, the efficiency of wireless power transmission may increase.

The resonator 1701 may include a power supply. The power supply may be a direct power supply that is directly connected to the resonator and provides power thereto. The power supply may be an indirect power supply that is indirectly connected to the resonator and provides power thereto.

Figure 18:
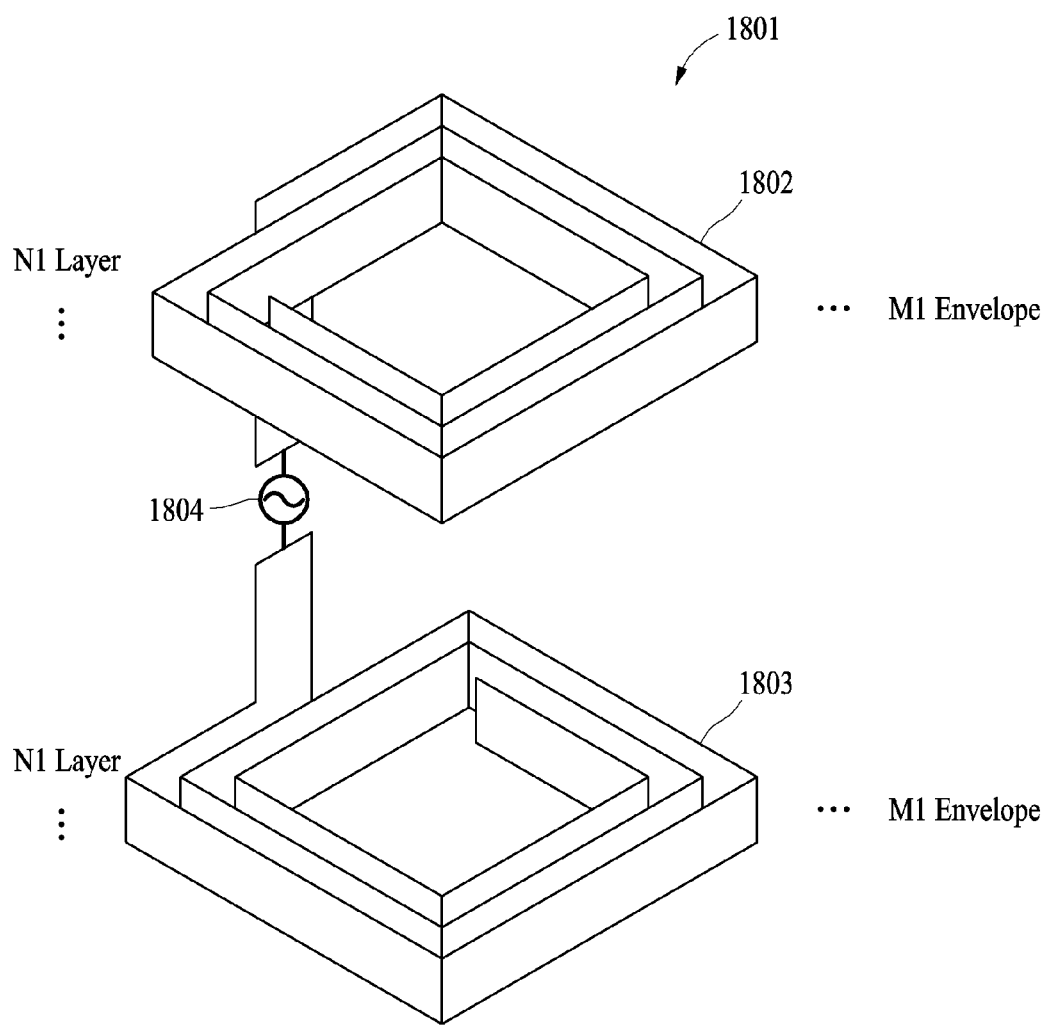
FIG. 18 is a diagram illustrating a resonator according to an example embodiment.

FIG. 18 is a diagram illustrating a resonator according to an example embodiment.

Referring to FIG. 18, a resonator 1801 may include a resonator upper part 1802, a resonator lower part 1803, and a power supply 1804.

The resonator upper part 1802 may be arranged in the upper end of the resonator 1801. The resonator upper part 1802 may include a spiral layer having a spiral structure that is wound to face the wide surface of a conducting wire including a cross-section having a vertical rectangular shape. The resonator upper part 1802 may have a laminating structure including a spiral layer including one or more layers. The resonator upper part 1802 may include a spiral layer including N1 layers, which is a plurality of layers. As the number of layers of the resonator upper part 1802 increases, the efficiency of wireless power transmission may increase. The resonator upper part 1802 may include a spiral structure including M1 envelopes. As the number of envelopes of resonator upper part 1802 increases, the efficiency of wireless power transmission may increase.

The resonator lower part 1803 may be arranged in the lower end of the resonator 1801. The resonator lower part

1803 may include a spiral layer having a spiral structure that is wound to face the wide surface of a conducting wire including a cross-section having a vertical rectangular shape. The resonator lower part 1803 may include a spiral layer including N1 layers, which is a plurality of layers. As the number of layers of the resonator lower part 1803 increases, the efficiency of wireless power transmission may increase. The resonator lower part 1803 may include a spiral structure including M1 envelopes. As the number of envelopes of the resonator lower part 1803 increases, the efficiency of wireless power transmission may increase.

The power supply 1804 may be connected to the resonator upper part 1802 and the resonator lower part 1803 and may provide power thereto. The power supply 1804 may include at least one of a direct power supply and an indirect power supply, or may be a combination of two or more thereof.

The resonator 1801 may further include an element arranged in the center of the resonator 1801, which is between the resonator upper part 1802 and the resonator lower part 1803. The element may include a spiral layer having a spiral structure that is wound to face the wide surface of a conducting wire including a cross-section having a vertical rectangular shape. The element may have a laminating structure including a spiral layer including one or more layers.

Figure 19:
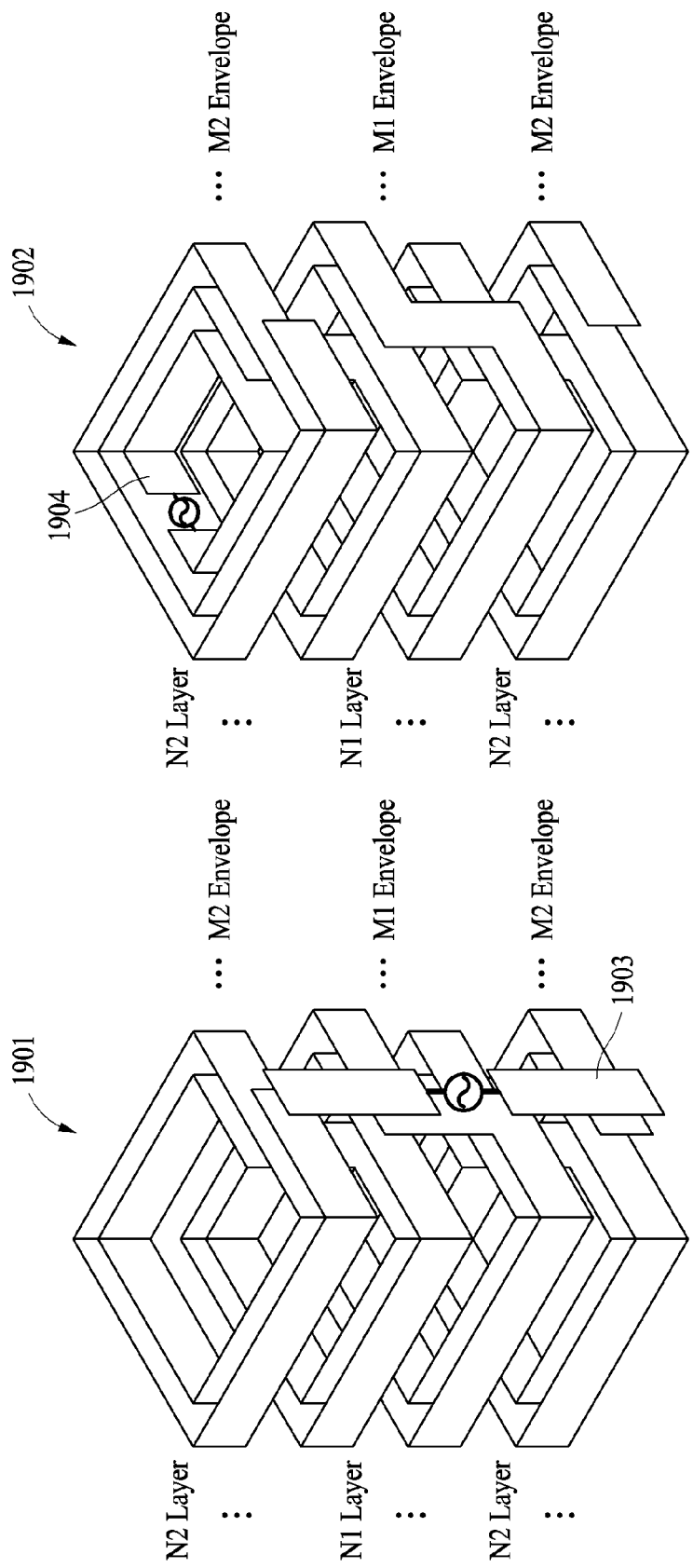
FIG. 19 is a diagram illustrating a resonator including an indirect power supply according to an example embodiment.

FIG. 19 is a diagram illustrating a resonator including an indirect power supply according to an example embodiment.

When the resonator described above functions as a transmitter of wireless power transmission, the resonator may be connected to a power supply. The power supply may be a direct power supply that is directly connected to the resonator and provides power thereto. The power supply may be an indirect power supply that is indirectly connected to the resonator and provides power thereto.

Referring to FIG. 19, as an example of an indirect power supply, a resonator 1901 connected to an electric dipole power supply and a resonator 1902 connected to a loop element are illustrated. Accordingly, the power supply may include at least one of a direct power supply and an indirect power supply, or may include a combination of two or more thereof.

The indirect power supply may be independent from adjustment of input impedance or output impedance. Thus, by using the indirect power supply, a resonator may be manufactured based on a load or impedance of the power supply.

Figure 20:
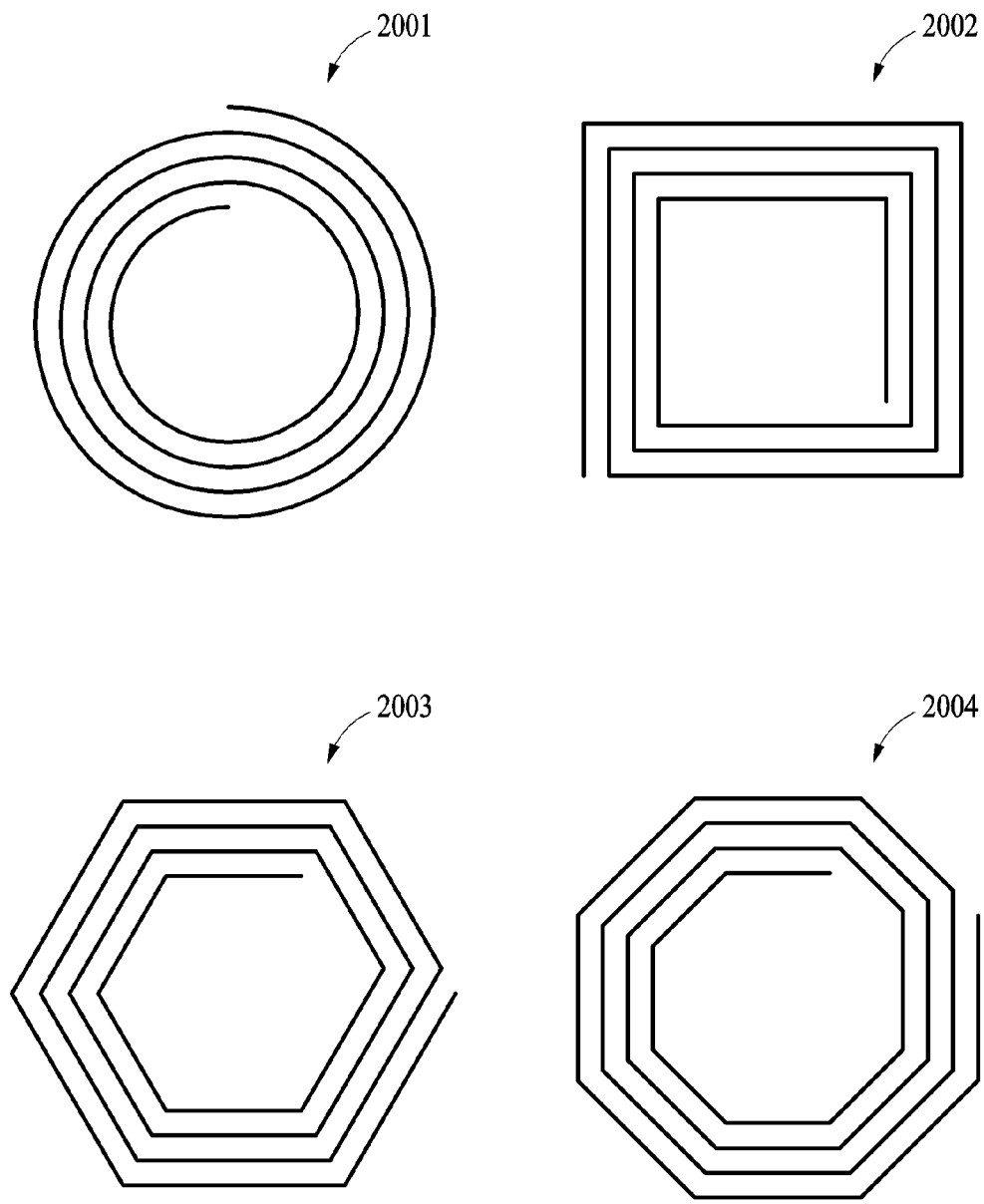
FIG. 20 is a diagram illustrating a plurality of spiral structures according to an example embodiment.

FIG. 20 is a diagram illustrating a plurality of spiral structures according to an example embodiment.

FIG. 20 illustrates a spiral structure applicable to a resonator. The structure illustrated in FIG. 20 may be a structure viewing the first element upper part, the first element lower part, and the second element, which are described above, from the top or the bottom.

Accordingly, the first element and the second element may include at least one of a circular spiral structure 2001, a quadrangular spiral structure 2002, a hexagonal spiral structure 2003, and an octagonal spiral structure 2004, or a combination of two or more thereof.

The first element and the second element may include other polygonal structures than the ones listed above.

Figure 21:
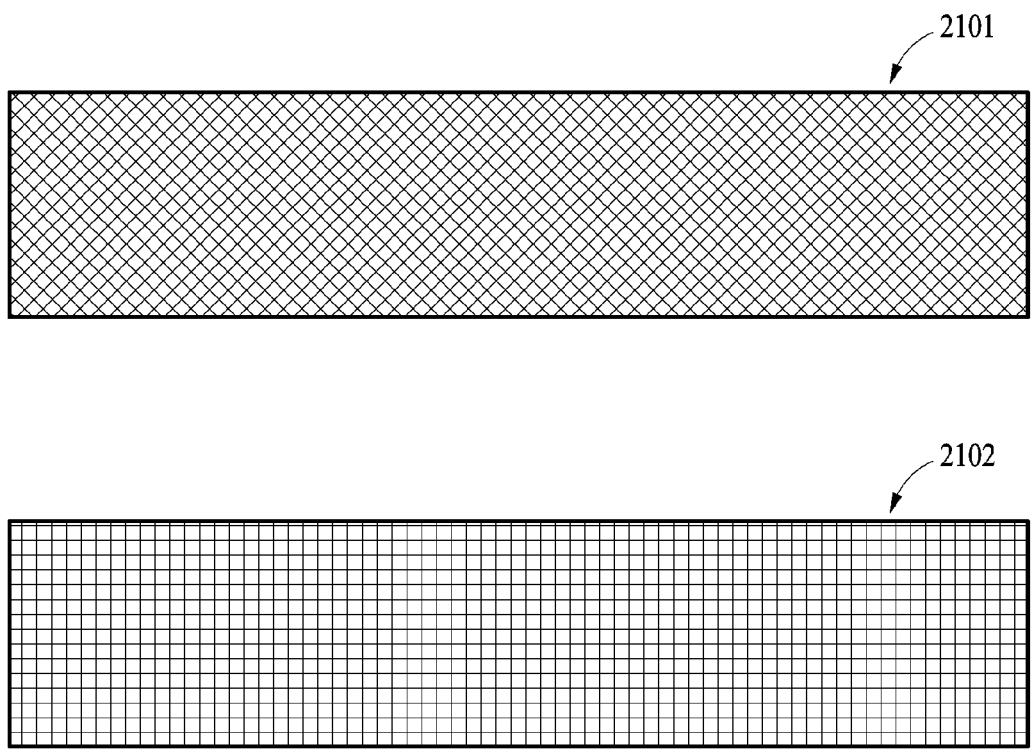
FIG. 21 is a diagram illustrating a pattern of a conducting wire that may be used in a resonator according to an example embodiment.

FIG. 21 is a diagram illustrating a pattern of a conducting wire that may be used in a resonator according to an example embodiment.

FIG. 21 illustrates a diagonal cross mesh pattern 2101 and a cross mesh pattern 2102.

A conducting wire included in the resonator of the present disclosure may have a tape shape of which a cross-section has a vertical rectangular shape. The conducting wire may include at least one of the diagonal cross mesh pattern 2101 and the cross mesh pattern 2102 or a combination of two or more thereof. When the conducting wire is a mesh pattern, the conducting wire may be less affected by wind and the weight of the resonator may decrease.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A wireless power transmission resonator comprising:
a first element comprising a first element upper part arranged in an upper end of a resonator and a first element lower part arranged in a lower end of the resonator, wherein the first element upper part comprises a spiral layer having a spiral structure that is wound to face a wide surface of a conducting wire comprising a vertical rectangular cross-section and the first element lower part comprises a spiral layer having a spiral structure that is wound to face the wide surface of the conducting wire comprising the vertical rectangular cross-section;
a second element arranged in a center of the resonator and between the first element upper part and the first element lower part and comprising a spiral layer having a spiral structure that is wound to face the wide surface of the conducting wire comprising the vertical rectangular cross-section; and
a power supply connected to the first element or the second element and configured to provide power to the resonator.

2. The wireless power transmission resonator of claim 1, wherein the first element upper part and the first element lower part comprise a laminating structure comprising a spiral layer comprising one or more layers, and
the first element upper part is connected to the first element lower part by one conducting wire comprising a vertical rectangular cross-section.

3. The wireless power transmission resonator of claim 1, wherein the spiral structure of the first element upper part and the spiral structure of the first element lower part comprise at least one of a circular spiral structure, a quadrangular spiral structure, a hexagonal spiral structure, and an octagonal spiral structure, or a combination of two or more thereof.

4. The wireless power transmission resonator of claim 1, wherein the second element comprises a laminating structure comprising a spiral layer comprising one or more layers and is connected to the first element upper part and the first element lower part by one conducting wire comprising a vertical rectangular cross-section.

5. The wireless power transmission resonator of claim 1, wherein the spiral structure of the second element comprises at least one of a circular spiral structure, a quadrangular spiral structure, a hexagonal spiral structure, and an octagonal spiral structure, or a combination of two or more thereof.

6. The wireless power transmission resonator of claim 1, wherein the conducting wire comprising the vertical rectangular cross-section comprises at least one of a diagonal cross mesh pattern and a cross mesh pattern or a combination of two or more thereof.

7. The wireless power transmission resonator of claim 1, wherein the power supply comprises at least one of an indirect power supply and a direct power supply or a combination of two or more thereof.

8. A wireless power transmission resonator comprising:
a resonator upper part arranged in an upper end of a resonator and comprising a spiral layer having a spiral structure that is wound to face a wide surface of a conducting wire comprising a vertical rectangular cross-section;
a resonator lower part arranged in a lower end of a resonator and comprising a spiral layer having a spiral structure that is wound to face the wide surface of the conducting wire comprising the vertical rectangular cross-section; and
a power supply connected to the resonator upper part and the resonator lower part and configured to provide power to the resonator.

9. The wireless power transmission resonator of claim 8, wherein:
the resonator upper part and the resonator lower part comprise a laminating structure comprising a spiral layer comprising one or more layers, and
the resonator upper part is connected to the resonator lower part by one conducting wire comprising a vertical rectangular cross-section.

10. The wireless power transmission resonator of claim 8, wherein the spiral structure of the resonator upper part and the spiral structure of the resonator lower part comprise at least one of a circular spiral structure, a quadrangular spiral structure, a hexagonal spiral structure, and an octagonal spiral structure, or a combination of two or more thereof.

11. The wireless power transmission resonator of claim 8, further comprising an element arranged in a center of the wireless power transmission resonator and between the resonator upper part and the resonator lower part, wherein the element comprises a spiral layer having a spiral structure that is wound to face a wide surface of a conducting wire comprising a vertical rectangular cross-section and a laminating structure comprising a spiral layer comprising one or more layers.

12. The wireless power transmission resonator of claim 11, wherein the spiral structure of the element comprises at least one of a circular spiral structure, a quadrangular spiral structure, a hexagonal spiral structure, and an octagonal spiral structure, or a combination of two or more thereof.

13. The wireless power transmission resonator of claim 8, wherein the conducting wire comprising the vertical rectangular cross-section comprises at least one of a diagonal cross mesh pattern and a cross mesh pattern or a combination of two or more thereof.

14. The wireless power transmission resonator of claim 8, wherein the power supply comprises at least one of an indirect power supply and a direct power supply or a combination of two or more thereof.

15. A wireless power transmission resonator comprising:
a resonator upper part arranged in an upper end of a resonator and comprising a laminating structure comprising one or more spiral layers having a spiral structure that is wound to face a wide surface of a conducting wire comprising a vertical rectangular cross-section;
a resonator lower part arranged in a lower end of a resonator, connected to the resonator upper part by one conducting wire, and comprising a laminating structure comprising one or more spiral layers having a spiral structure that is wound to face the wide surface of the conducting wire comprising the vertical rectangular cross-section;
an element arranged in a center of the resonator and between the first resonator upper part and the resonator lower part, connected to the resonator upper part and the resonator lower part by one conducting wire, and comprising a laminating structure comprising one or more spiral layers having a spiral structure that is wound to face the wide surface of the conducting wire comprising the vertical rectangular cross-section; and
a power supply connected to the element and configured to provide power to the resonator.

* * * * *